United States Patent [19]

Isham et al.

[11] 4,350,061
[45] Sep. 21, 1982

[54] WIRE STRIPPING MECHANISM

[75] Inventors: Leonard E. Isham; Marvin J. Peplow; Julius W. Sandy, all of Sycamore; Clyde M. ViPond, Waterman, all of Ill.

[73] Assignee: Ideal Industries, Inc., Sycamore, Ill.

[21] Appl. No.: 90,398

[22] Filed: Nov. 1, 1979

[51] Int. Cl.³ .............................................. H02G 1/12
[52] U.S. Cl. ..................................................... 81/9.51
[58] Field of Search ................... 81/9.51, 9.5 A, 9.5 R

[56] References Cited

U.S. PATENT DOCUMENTS

| | | | |
|---|---|---|---|
| 2,422,776 | 6/1947 | Cunny et al. | 81/9.51 |
| 2,724,985 | 11/1955 | Chamberlin | 81/9.5 A |
| 2,765,685 | 10/1956 | Stratman et al. | 81/9.51 |
| 2,871,740 | 2/1959 | Andren | 81/9.51 |
| 3,135,145 | 6/1964 | Trethewey et al. | 81/9.51 |
| 3,154,980 | 11/1964 | Hayden et al. | 81/9.51 |
| 3,361,016 | 1/1968 | Carpenter et al. | 81/9.51 |
| 3,376,627 | 4/1968 | Sitz | 81/9.51 |
| 3,552,449 | 1/1971 | Woodward et al. | 81/9.51 |

Primary Examiner—Roscoe V. Parker
Attorney, Agent, or Firm—Kinzer, Plyer, Dorn & McEachran

[57] ABSTRACT

This is concerned with a wire stripping mechanism and specifically is concerned with a mechanism for removing the insulation from the end of electric wires where the insulation is of a construction that is quite difficult to remove. More specifically the stripper is concerned with dealing with quite small wires where the insulation is thin and quite difficult to remove.

16 Claims, 18 Drawing Figures

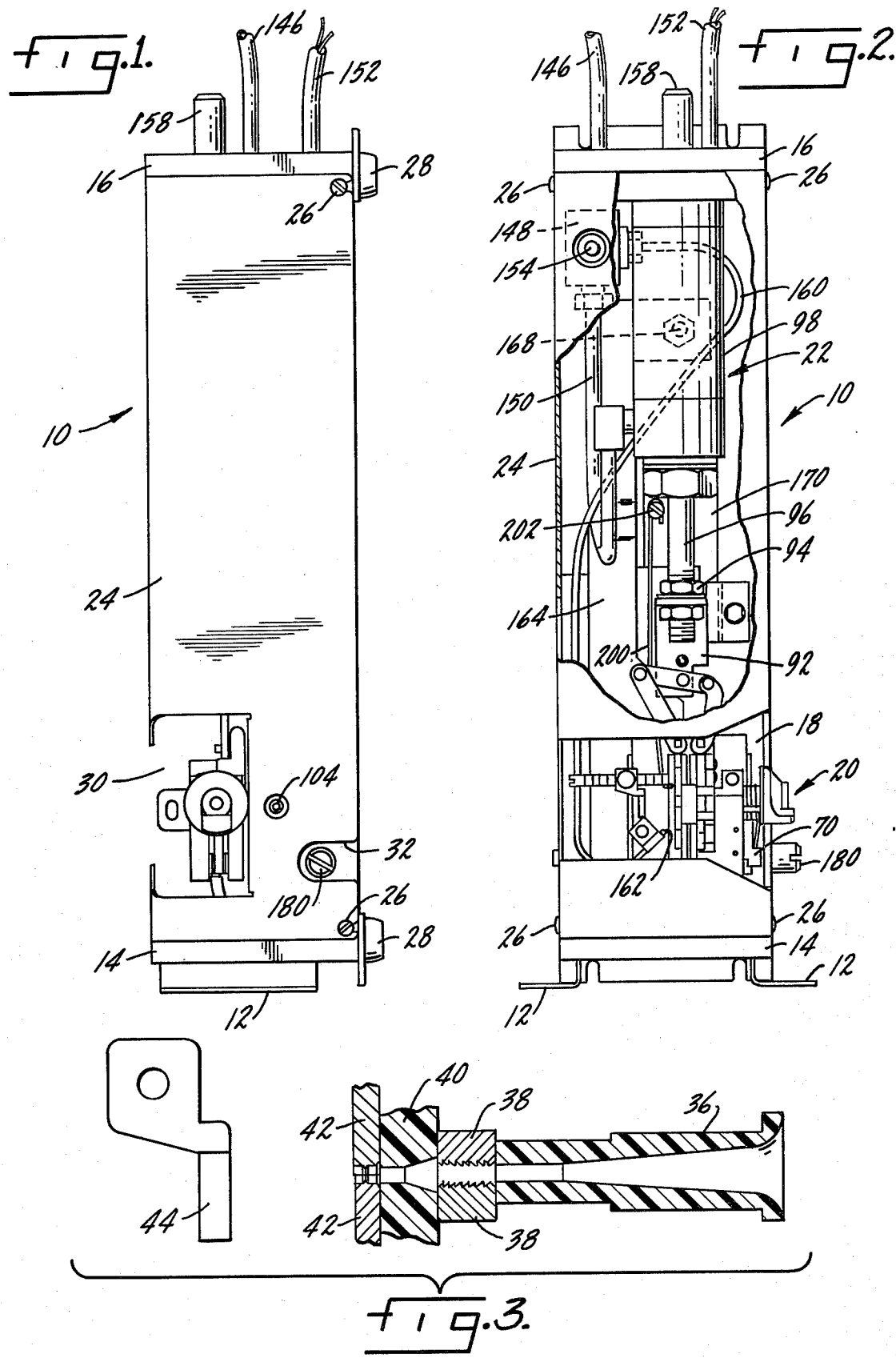

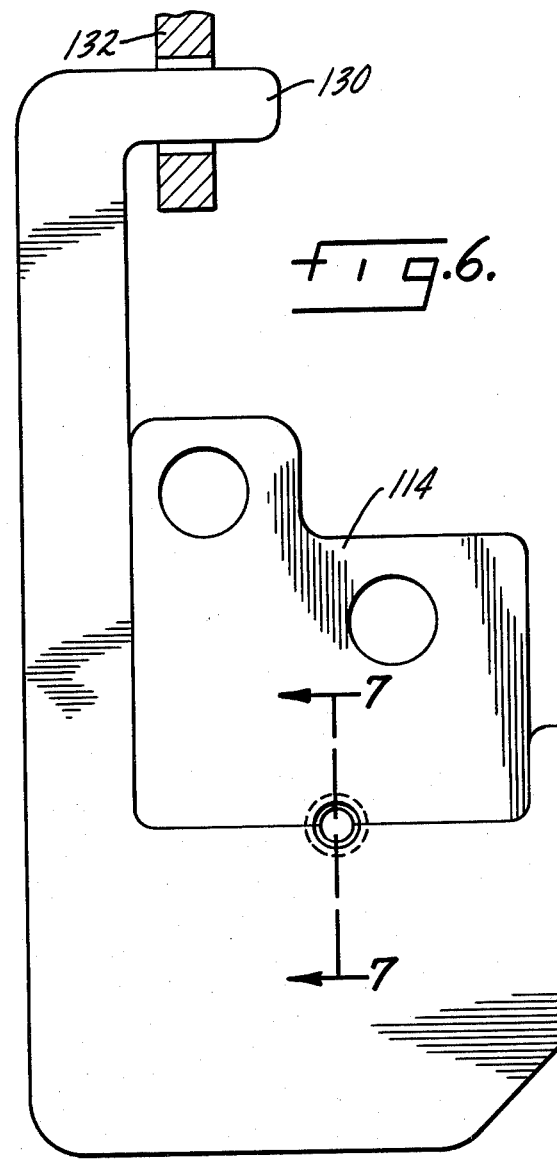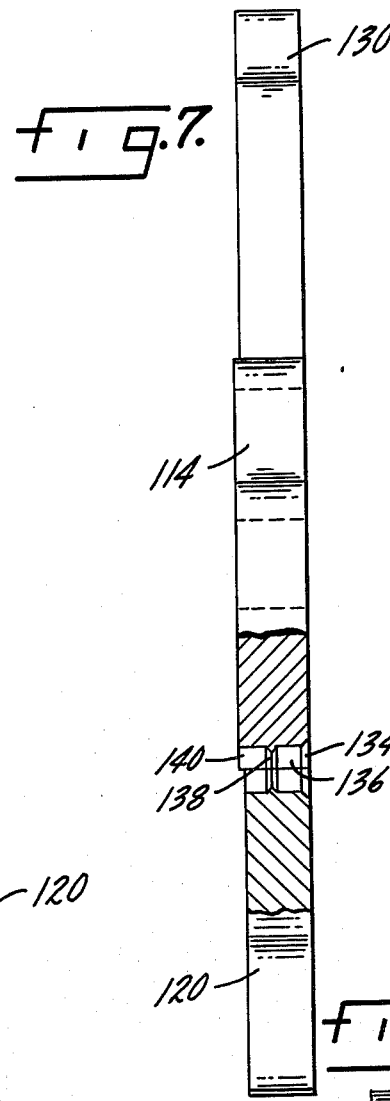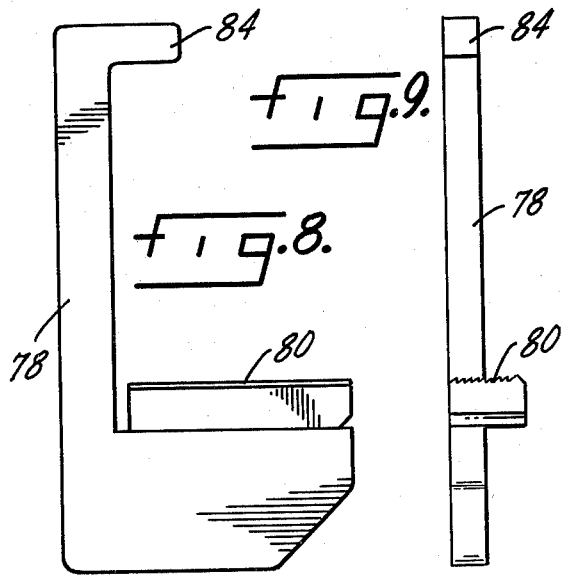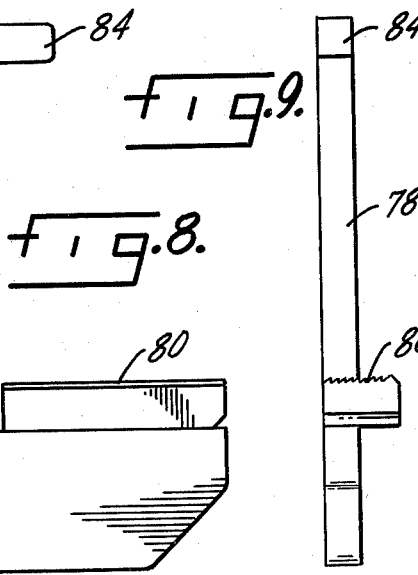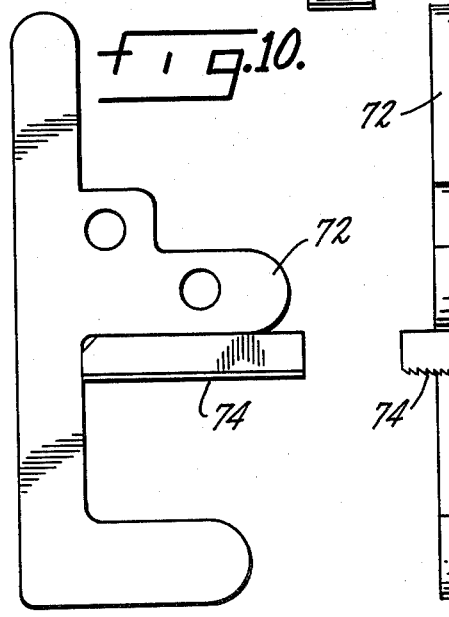

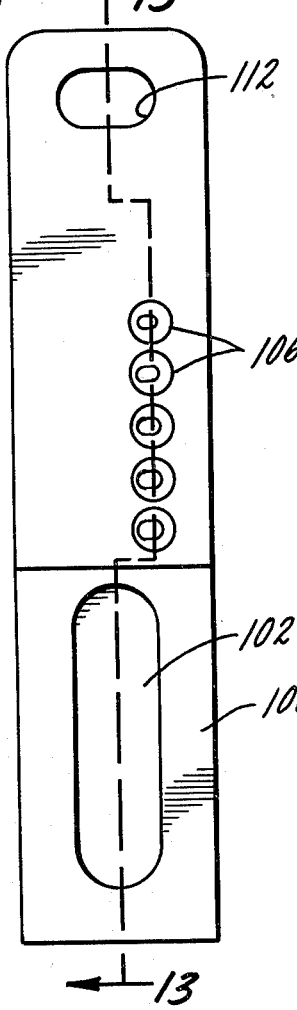
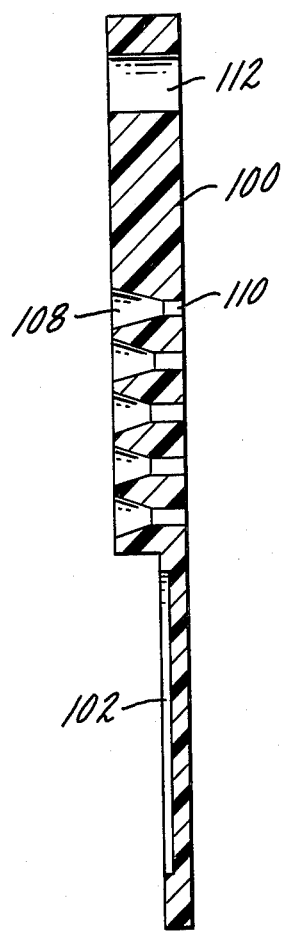
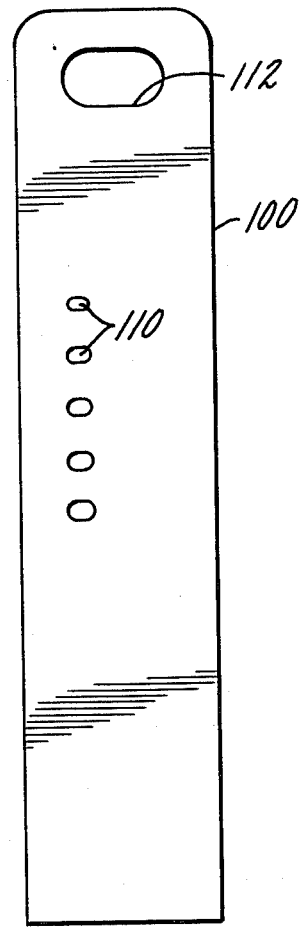
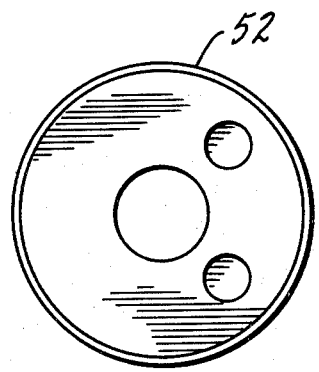
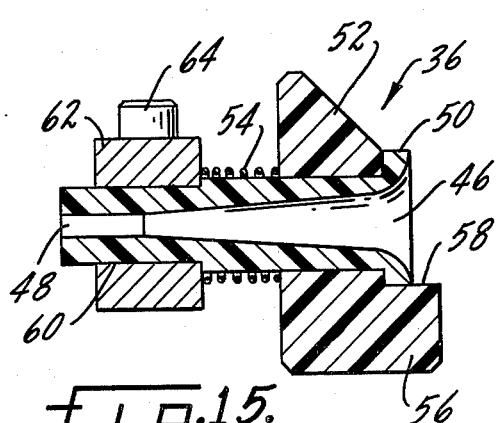
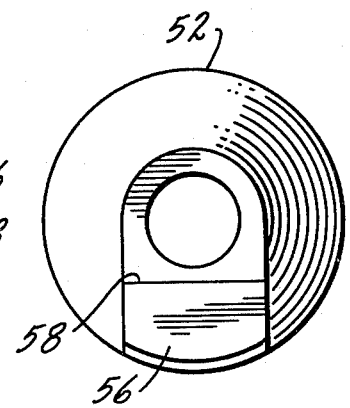

WIRE STRIPPING MECHANISM

SUMMARY OF THE INVENTION

This invention is concerned with a wire stripping mechanism which means a machine or device for removing the insulation from the end of an electric wire so it can be connected to a terminal or other wires in a joint.

A primary object of the invention is a stripper which is specifically constructed and arranged to deal with Kapton insulated wire or similar or equivalent material.

Another object is a stripper of the above type which is constructed to handle a range of wire sizes.

Another object is an air operated bench type stripper with an air ejector for the insulation removed from the ends of the wire.

Another object is a bench type stripper of the above type which is specifically constructed and arranged not to cut or nick the conductor.

Another object is a stripper of the above type which has grippers that are specifically constructed not to damage the insulation.

Another object is a stripper of the above type in which the action does not splay a stranded conductor.

Another object is a bench stripper of the above type which is constructed and arranged for finger actuation as compared to foot actuation.

Another object is a stripper of the above type which is constructed and arranged to be actuated by the wire that is inserted.

Another object is a bench stripper of the above type having an inlet collet for the wire to be stripped which is adjustable on both the X and Y coordinates so that it can be accurately positioned.

Another object is a stripper of the above type in which the collet and the actuating switch are both adjustable on the X and Y coordinates.

Another object is a stripper that is specifically constructed to handle extra thin wires.

Another object is a stripper of the above type which does not offer or give any resistance to pulling the wire out.

Another object is a stripper of the above type which has a wire guide between the gripping and stripping jaws.

Another object is a wire guide and a stripper of the above type which is adjustable so as to handle a range of wire sizes.

Other objects will appear from time to time in tne ensuing specifications and drawings.

BRIEF DESCRIPTION OF THE DRAWINGS

FIG. 1 is a front view of the stripping mechanism;

FIG. 2 is a side view with certain parts of the housing cover broken away;

FIG. 3 is a section through the stripping station;

FIG. 6 is a side view, on an enlarged scale, of the cutting blade;

FIG. 7 is a front view of FIG. 6, partly in section, along the line 7—7 of FIG. 6;

FIG. 8 is a side view of the movable gripping blade;

FIG. 9 is a front view of FIG. 8;

FIG. 10 is a side view of the other gripping blade;

FIG. 11 is a front view of FIG. 10;

FIG. 12 is a side view of the wire guide;

FIG. 13 is a section along line 13—13 in FIG. 12;

FIG. 14 is a back view of the wire guide;

FIG. 15 is a sectional view of the switch ring and collet;

FIG. 16 is a rear view of the switch ring;

FIG. 17 is a front view of the switchring; and

DESCRIPTION OF THE PREFERRED EMBODIMENTS

Figure 4:
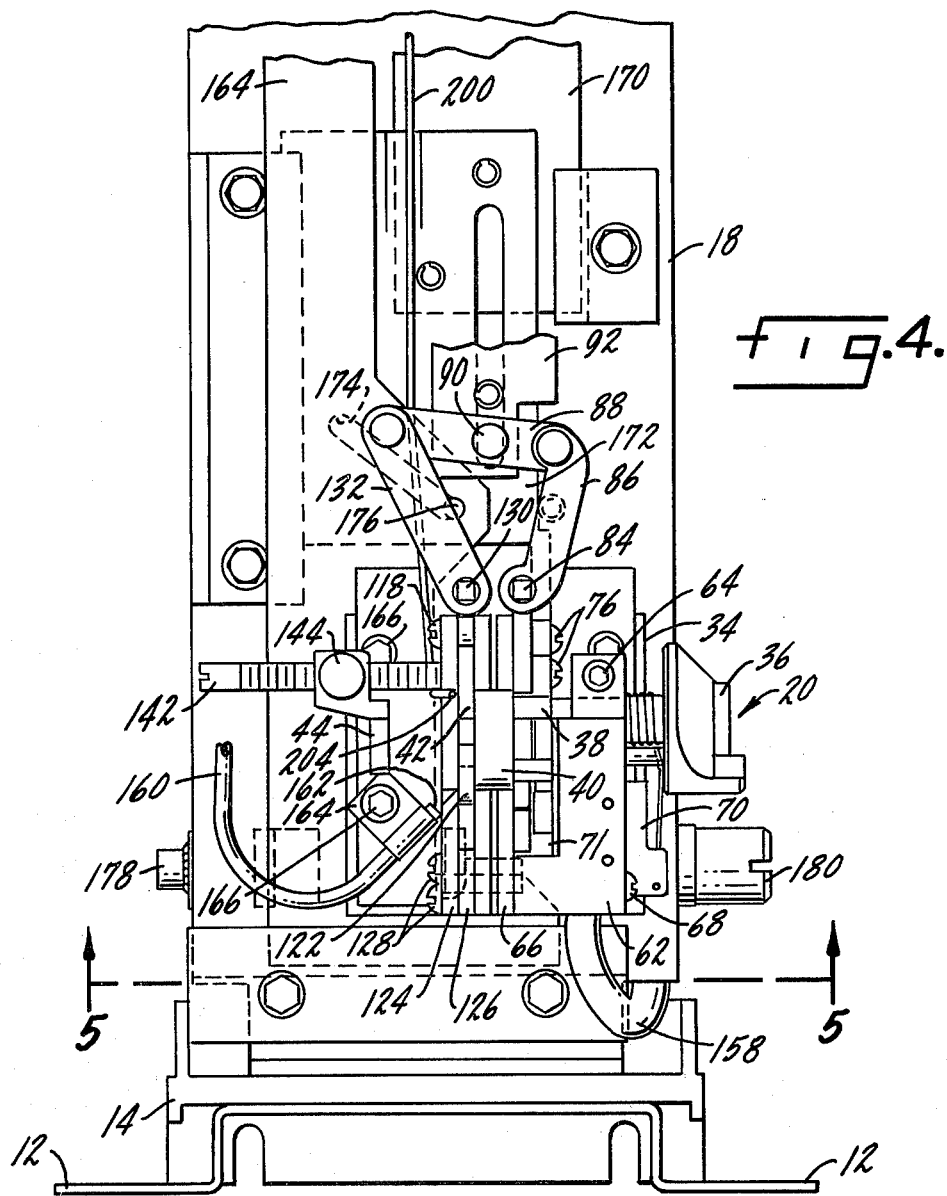
FIG. 4 is an enlargement of part of FIG. 2 with the housing cover removed.

In FIGS. 1 and 2 a stripper has been shown as including a generally elongated housing designated 10 disposed in a generally upright position so that it rests on flanges 12 which are connected to or formed integrally with one of the ends 14 and 16 which in turn are connected by a base plate 18. A stripping station, indicated generally at 20 is positioned toward one end of the unit with a power mechanism 22 toward the other end. The operating mechanism is enclosed by a cover 24 which is shown in place in FIG. 1 so that it encloses both sides and the top of the unit and is held there by suitable screws 26 or the like which, when loosened, will allow the cover to be lifted, to the left in FIG. 1, to expose the operating mechanism. Rubber feet or the like 28 may be mounted on what appears to be the side in FIG. 1 so that the unit can be used either in a vertical or upright position as in FIG. 1, or in a horizontal position in which the rubber feet 28 would rest on a bench. The cover 24 has a suitable opening 30 through the top and on both sides to provide access to the stripping station as well as a slot 32 in one side to provide access to an adjustment mechanism to be explained later.

The stripping station is defined by a stripping mechanism to be explained in detail later all of which is more or less mounted on a block 34. As shown in FIG. 3 the stripping station is defined first by an inlet collet 36, a pair of gripping blades 38, a wire guide 40, a pair of stripping blades 42 and a wire stop 44.

Considering first the collet 36, it has a funnel shaped inlet 46 which tapers to a constant diameter 48 which should be slightly larger than the maximum O.D. wire the unit is to handle. The collet has a flange 50 at the front end which bears against the front of a switch ring 52 which fits around the collet and is spring biased at 54 against the collet flange. The switch ring has a protrusion or finger contact 56 with a flat 58 that prevent the switch ring from turning on the collet. The rear of the collet is of a reduced diameter as at 60 and fits through a mounting block 62 which is split and tightened around the rear of the collet by a bolt 64 or the like. The finger contact 56 should be "down" and is shown in the "down" position in FIG. 1 where the unit is to be resting on the feet 28. If the unit is to be operated in a horizontal position, the bolt 64 should be loosened and the switch ring and collet should be rotated 90° clockwise, then the bolt 64 retightened.

The switch block 62 may be mounted on a bracket 66 by suitable screws 68 or the like with the bracket 66 in turn being mounted on the block 34. A microswitch 70 may be adjustably mounted on the front of the switch holder or block so that when the finger of the operator contacts and pushes the switch ring 52 when a wire is being inserted in the collet, the rear of the switch ring, as shown in FIG. 2, will close the microswitch thus energizing the power mechanism and causing a stripping cycle as explained hereinafter.

The rear of the switch holder 62 is recessed, as shown at 71 in FIG. 4 to accept the gripping blades 38 which are shown in detail in FIGS. 8–11. The upper gripper 72 has a gripping face 74 and is mounted on the bracket 66 by suitable screws 76 or the like so that it does not move. The lower gripping blade 78 also has a corresponding gripping face 80 which opposes the fixed gripping face 74 on the other blade. Blade 78 is movable and is positioned between the upright leg of bracket 66 and the back of the switch holder 62 in the recess 71. One end of the movable blade 78 has a finger 84 which fits into a link 86, in FIG. 4, which is pivoted to a toggle 88 which in turn is pivoted at 90 on a bracket 92 which is connected as at 94, in FIG. 2, to the piston rod 96 of a power cylinder 98.

The wire guide 40 has a tab 100, in FIG. 12, on the lower end thereof with an elongated recess 102. The tab fits into a slot in the mounting block 34 and is fixed by a set screw 104 which is accessible through a hole in the cover 24 shown in FIG. 1. As shown in FIGS. 12 through 14 the wire guide has a plurality of openings 106 graduated in size so as to accept a number of wire sizes, the largest on the bottom and the smallest on the top although it might be otherwise. Each opening, as shown in FIG. 13, has a funnel-shaped inlet 108 followed by a channel 110 which is somewhat elliptical in cross section, as shown in FIG. 14, so that the wire will be guided more accurately to the cutting blades. As shown in FIG. 1 the wire guide extends above the gripping and stripping mechanism so that when the set screw 104 is loosened, the operator can grasp the top of the wire guide, as at 112, and raise or lower it to position one selected hole of the group opposite the collet.

The stripping blade includes a fixed upper blade as shown in FIG. 6 as at 114 which is held on a bracket 116 by a screw or the like 118. A movable blade 120 slides in a guide channel 122 formed by a plate 124 and spacer 126 which are mounted on the bracket by screws or the like 128. The movable blade 120 has a finger 130 which fits into a link 132, in FIG. 4, which is mounted on the other end of the toggle 88.

The stripping channel through the blades is shown in detail in FIG. 7, one half being formed in each blade. The channel includes a funnel-shaped inlet 134 followed by a cylindrical or collet portion 136 to a raised knife edge 138 followed by another collet or cylindrical portion 140.

The wire stop 44 is adjustably mounted on a knurled rod 142, in FIG. 4, by a set screw 144 with the inner end of the rod being threaded into the bracket and fixed cutting blade 114 to hold it in place.

The power cylinder 98 may be air operated and has an air connection 146 which is connected to a control valve 148 to supply air through a line 150 to one side of the cylinder. The valve 148 is solenoid operated and has a suitable electrical connection 152. The air valve has a manual override 154 so that the unit can be manually operated. The microswitch 70 is connected by a lead 156 to the circuit so that it operates the solenoid valve 148. The rear of the air cylinder has a rod 158 extending therefrom which passes freely through a sleeve or bushing in the end wall or cap 16 so that under appropriate circumstances the cylinder can move toward or away from the stripping station.

An air tube or pipe 160 extends from the air valve 148 and discharges, as at 162 at or across the back of the cutting or stripping blades where the end of the pipe, like a nozzle, is held in place by a bracket 164.

Figure 5:
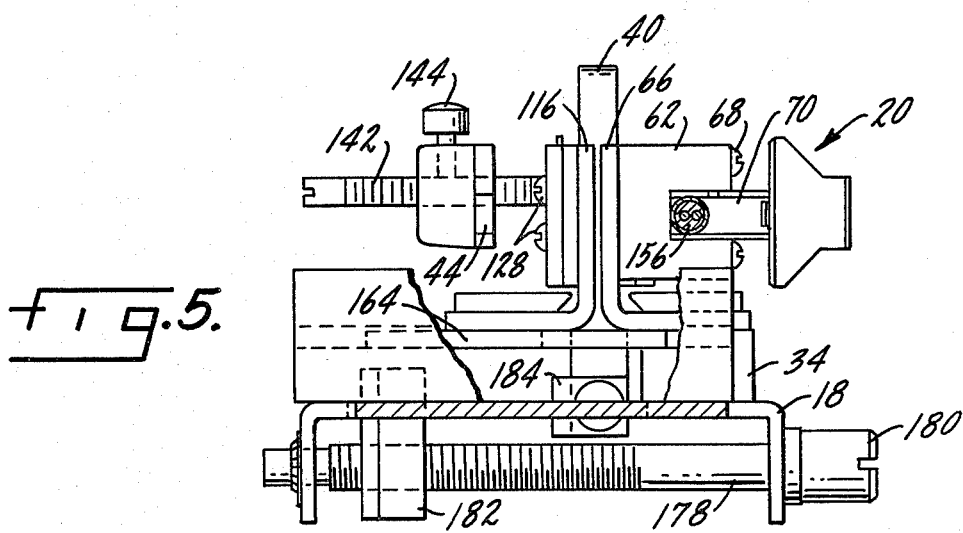
FIG. 5 is a section along line 5—5 of FIG. 4.

The stripping blades 42, wire stop 44 and the end 162 of the air tube 160 are all mounted on bracket 116 which is in turn mounted on a lever 164 by suitable bolts 166 or the like. The upper end of lever 164 is pivoted at 168, beneath the air cylinder 98. When the power cylinder retracts the bracket 92 thereby drawing the toggle 88 upwardly in FIG. 4 to raise the movable gripping and stripping blades to effect the beginning of a stripping action, the stroke of the upward movement is limited by the distance it takes to close the gripping and stripping blades on the wire. Thereafter additional movement of the piston in the cylinder will cause the cylinder to move down in FIG. 2 which lowers or moves a bracket 170 which carries a cam 172 on the end thereof having a cam slot 174 formed therein receiving a pin 176 depending from the lever arm 164. Downward movement of the cam 172 therefore will cause the pin 176 and the arm 164 to be moved outwardly or to the left in FIG. 4 which pivots the arm 164 about pivot 168 thereby separating the gripping blades, wire stop and air hose 162 from the collet, gripping blades and wire guide. This is to say that the stripping blades, wire stop and air hose 160 will move to the left in FIG. 4 thereby pulling the insulation off of the end of the wire. The "stroke" or amount of separation is determined by an adjustment mechanism, shown in FIG. 5, which includes a threaded rod 178 extending through the bottom of the base with an adjustment knob 180 on the outer end thereof to be accessible to the operator. The rod carries a travelling stop 182 which travels in a slot in the base 18 opposite a finger 184 which extends down from the end of the lever arm 164. This manual adjustment of the knob 180 will position the stop 182 closer or farther away from the finger 184 in accordance with the desired strip length.

Figure 18:
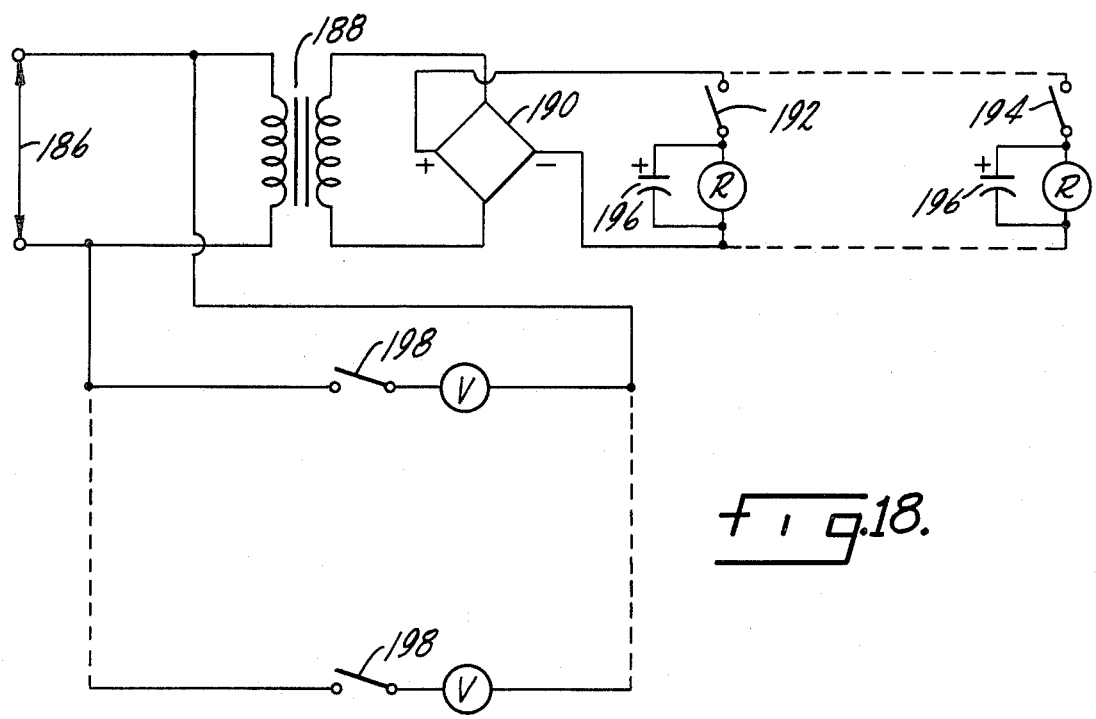
FIG. 18 is a wiring diagram.

The circuit for the unit is shown in FIG. 18 in which a suitable source of current 186 is connected to a step down transformer 188 then through a full wave bridge in rectifier 190 to a plurality of suitable microswitches, shown in this case as two, 192 and 194 each of which operates in series with a single pole relay R and capacitor 196. The valve of the capacitance 196 is selected for a delay to hold a pulse through the valve long enough to prevent repetitive action on the same stripping operation. Each relay R controls and operates a switch 198 for an air valve V which corresponds to valve 148. Two relays are shown as are two switches 198 and valves V but it could be more or less. Two or more would be used, all in parallel on source 186, when a plurality of such units are used or ganged together.

A stripper wire or bail 200 is connected as at 202 to the bracket 170 and extends along the backside of the stripping blades ending in a raised finger 204 which is positioned to sweep across the back of the stripping blades when the stripping blades, the wire stop and air nozzle separate from the gripping blades, collet, etc. as caused by the cam 174 and pin 176. Thus in addition to blowing the stripped insulation away from the back of the stripping blades the wire or bail functions as an insulation ejector to insure that the slug or removed insulation is physically knocked off of the back of the stripping blades.

The use, operation and function of the invention are as follows:

The unit is in the nature of a bench stripper meaning that it is to be used on a production line and may be disposed in either a horizontal or an upright position. However, many aspects of the invention are also usable or adaptable to hand operated strippers which may be considered portable.

The device is specifically constructed and arranged to be used to strip so-called Kapton insulated wire which is extremely difficult, first to grip, second, to cut through with the stripping blades and, third, to pull off of the end of the wire. In addition, the device is concerned with quite small wire, for example something on the order of 16 to 24 gauge stranded wire although it may be used with solid wire as well.

Assuming that the unit is mounted on a bench in a production line, the operator first inserts the wire in the funnel-shaped open end of the collet 36 and then pushes it all the way, through the wire guide, until it hits the wire stop 44. At this point the gripping and stripping blades 38 and 42 are open. The wire to be stripped is quite small and very flexible and the combination of the collet 36, which receives it, plus the wire guide 40 between the two operating blades insures alignment, direction and accuracy of the wire during its travel until it hits the wire stop 44 and thereafter holds it in place so that it will line up with the accurately and precision sized cutting openings in the stripping blades as shown in FIG. 6. If the wire was allowed to seek its own position, you could by no means be sure that it would be aligned with the cutting openings in the stripping blade. Thus the wire guide between the gripping and stripping blades has the distinct advantage of accuracy of wire position. Such an arrangement may not be necessary where the wire to be stripped is substantially larger since it will have sufficient rigidity on its own to position itself. But with the wire size mentioned above, the wire is too flexible to position itself accurately.

When the wire has been fully inserted so that it contacts the wire stop 44, the operator then pushes the switch ring by pushing the abutment 56 with the hand that is holding the wire to be stripped. The switch ring closes the switch 70 which initiates the cycle. The solenoid valve 148 supplies air to the power cylinder 98 which, initially, causes it to retract the piston rod 96 thereby closing the gripping and stripping blades—in this case raising both of the lower blades. When the blades close fully, the cylinder 98 moves down which, through the cam slot 174 and pin 176, pivots the lever arm 164, to the left in FIG. 4, separating the stripping blades, wire stop and air nozzle 162 from the gripping blades, collet, etc. The air valve 148 also supplies air through the tube 160 to the nozzle 162 so that as the stripping blades separate from the the gripping blades, an air blast will be applied to the stripped end tending to blow the removed insulation away. Kapton has a propensity for shattering or flaking so that it is desirable to blow the small flecklike particles away. At the same time the insulation ejector finger 204 will move across the rear of the stripping blades causing the removed insulation also to be removed, shattered or knocked off. A Kapton insulated wire normally is a copper wire that is tin plated and the Kapton is a wrap thereon with a film dispersion coating on the outside which makes it possible for stamping for identification. And it is the wrap that has the tendency to shatter, causing specks which can jam the unit unless they are blown away.

The power cylinder 98 is air operated in one direction with a spring return. So the stripping blades will move to the right, in FIG. 3, from their fully opened position and then both the stripping and gripping blades will open, meaning that the lower jaws are lowered. As soon as the operator withdraws the wire, he releases the pressure on the switch ring which allows the spring 54 to move the switch ring 52 to the right which allows the microswitch 70 to open thereby completing the cycle and allowing all parts to return to their original positions.

The holes through the block 62 for accepting the screws 68 are oversized so that prior to tightening the screws 68, the block can be accurately positioned, both along the X and Y axis so that the collet opening can be accurately lined up with the cutting opening 140 in the stripping blade. The wire guide 40 is also adjustably mounted so that the selected hole, depending upon the size of wire involved, can also be accurately lined up with the cutting opening 140 in the stripping blades. The stripping blade itself is the base or benchmark and both the wire guide and the collet are adjusted to it.

The microswitch 70 has been shown as mounted on the front of the unit so that it is operated, in effect by the operator's finger, but it could be mounted on the wire stop 44 so that it would be closed by the end of the Kapton wire when it was fully inserted thereby initiating the stripping cycle. Further there is no resistance to the pull out of the wire since the blades will all be fully opened at the completion of the strip and the operator can very easily withdraw the wire.

One of the advantages of the manual override 154 on the air valve is that a jam can be manually cleared.

The stripping channel or station has the advantage that the highly flexible Kapton coated guite small wire is first guided by the funnel-shaped opening of the collet to the cylindrical channel 48. The flexible wire then freely passes between the opposed faces 74, 80 of the gripping jaw without contact or support. But the end of the wire is next picked up by the funnel 108 of the wire guide passage so the support is provided between or on both sides of the open gripping jaws. Thereafter the wire passes between the open faces of the stripping jaw until it hits the wire stop 44. It will be noted that the wire guide 40 positively supports and controls the position of the highly flexible wire for the cutting blades which are on one side of it and the gripping blades which are on the other side. It is extremely important that the wire guide accurately position the wire for the stripping blade so that the wire will be evenly and accurately centered on the stripping opening in the stripping blades.

The unit can be used as an individual unit or it can be set up in banks for various wire sizes. The wire can be easily withdrawn once the strip has been effected and there is no resistance to the pull out.

One of the preferred forms and several variations have been disclosed and suggested, it should be understood that suitable additional modifications, changes, substitutions, alterations and alternates may be made without departing from the invention's fundamental thinking.

I claim:

1. In a stripper mechanism for removing the insulation from the ends of insulated electric wires, a frame with a defined wire insertion path, a stripping station on the frame defined by a pair of gripping jaws and a pair of stripping jaws, the stripping jaws being movably mounted (relative to the gripping jaws) on the frame so as to define a separating action relative (thereto) to the gripping jaws in (a) the defined direction, at least one (the) of the jaws of each pair being movably mounted relative to the other jaws so as to perform an opening and closing action between them generally at right angles to the defined direction, the gripping jaws being fixed on the frame only an opening and closing action relative to the wire insertion path, a guide fixed on the frame so that it is contiguous to the gripping jaws at all times and positioned between the pairs of jaws with an opening therein defining a path of travel for the wire to be stripped when it is initially inserted between the jaws prior to a stripping action, and a collet fixed on the frame having a funnel shaped guide channel aligned with the opening in the guide and positioned on the opposite side of the gripping jaws from the guide.

2. The structure of claim 1 further characterized in that the guide includes a plurality of openings therein graduated in size so as to accept a plurality of wire sizes, and means for adjusting the guide so as to align a selected one of the openings on the wire insertion path.

3. In a stripper mechanism for removing the insulation from the ends of electric wires, a frame, a stripping station on the frame, a wire insertion path aligned with and extending through the stripping station defined at least in part by a wire guide collet having a funnel shaped channel therein on one side of the stripping station generally coaxial with the wire insertion path and adapted to receive a wire to be stripped, pairs of gripping and stripping jaws at the stripping station aligned with the wire insertion path for gripping the end of a wire inserted through the funnel shaped channel in the wire guide collet and for stripping insulation from the inserted end of the wire, power means for operating the jaws to perform a gripping and stripping action, a switch on the frame for energizing the power means, and a movable contact adjacent the wire guide collet arranged and positioned to be engaged by the hand of the operator holding the wire upon insertion of the wire so as to close the switch and energize the power means, the contact being in the form of a protrusion on an annulus at least partially surrounding the wire guide collet and movable thereon in the direction of the wire insertion path so as to contact and operate the switch.

4. The structure of claim 3 further characterized in that the annulus is indexable about 90° so that the protrusion is positionable below the collet so that the mechanism can be operated in two positions.

5. The structure of claim 4 further characterized in that the collet has a peripheral flange on the outer end thereof, the annulus surrounding the collet and being slidable thereon, and a spring for biasing the annulus against the collet flange and away from the switch.

6. The structure of claim 5 further characterized by and including matching flats between the collet and annulus to prevent rotation of the annulus on the collet.

7. In a wire stripper mechanism, a stripping station having a wire insertion path therein defined by a fixed inlet collet having a funnel shaped passage coaxial with and defining the first part of the insertion path, movably mounted gripping blades on each side of the path after the collet and defining the second part of the wire insertion path, the gripping blades being constructed to perform a closing and opening action generally at right angles to the wire insertion path and being separated by a distance substantially greater than the diameter of the wire to be stripped when in their open position, a fixed wire guide after the gripping blades defining the third part of the wire insertion channel and having an enclosed channel with a diameter at least in part on the order of the outside diameter of the wire to be stripped, and movably mounted stripping blades having an insulation cutting notch therein after the fixed guide defining the fourth part of the wire insertion channel, the stripping blades being constructed to perform a closing and opening action generally at right angles to the wire insertion path and being separated by a distance substantially greater than the outside diameter of the wire to be stripped when in their open position, the cutting blades being constructed and arranged to be moved, as a unit, along the wire insertion path in a direction away from the fixed guide so as to pull the separated insulation off of the end of the wire, the gripping blades being fixed in a longitudinal direction so that they perform only an opening and closing action relative to the wire insertion path.

8. The structure of claim 7 further characterized in that the enclosed channel in the fixed guide has an inlet funnel portion therein.

9. The structure of claim 7 further characterized in that the cutting notch in the stripping blades has an inlet funnel portion.

10. The structure of claim 7 further characterized in that the fixed guide is adjustably mounted generally at right angles to the wire insertion path so as to be positionable in a plurality of positions, and a plurality of enclosed channels of varying size arranged in space relation thereon so that each is positionable in turn in alignment with the wire insertion path.

11. The structure of claim 7 further characterized in that the enclosed channel in the wire guide is somewhat elliptical with the major axis thereof being disposed in the direction of movement of the stripping blades when they perform their closing and opening action.

12. In a stripper mechanism for removing the insulation from the ends of insulated electric wires, a frame, a stripping station on the frame defined by a pair of gripping jaws and a pair of stripping jaws with cutting notches, at least one of the pairs being movably mounted relative to the other pair so as to define a separating action relative to each other in a defined direction, at least one of the jaws of each pair being movably mounted relative to the other jaw so as to perform an opening and closing action between them generally at right angles to the defined direction, and a guide between the pairs of jaws with an opening therein defining a path of travel for the wire to be stripped when it is initially inserted between the jaws prior to a stripping action, the guide including a plurality of openings therein aligned in a direction at right angles to the path of travel of the wire and graduated in size so as to accept a plurality of wire sizes, and means for adjusting the guide in a direction at right angles to the path of wire travel so as to align a selected one of the openings with the cutting notches in the stripping (blades) jaws.

13. The structure of claim 12 further characterized in that the adjusting means includes a set screw aligned with a lower portion of the guide.

14. The structure of claim 13 further characterized by and including an elongated recess in the lower portion of the guide aligned with the set screw.

15. The structure of claim 12 further characterized in that the guide has a portion extending above the openings therein and having a portion to be grasped by the operator for adjustment thereof.

16. The structure of claim 12 further characterized in that each of the openings is somewhat elliptical with the major axis thereof being disposed in the direction of movement of the stripping blades when they perform their closing and opening action.

* * * * *